(12) United States Patent
Mechler et al.

(10) Patent No.: US 10,700,502 B2
(45) Date of Patent: Jun. 30, 2020

(54) WALL PENETRATION PANEL

(71) Applicant: RPH Intellectual Holdings, LLC, San Antonio, TX (US)

(72) Inventors: Stephen L. Mechler, San Antonio, TX (US); Tom D. Knight, Jr., San Antonio, TX (US); John R. Barbieri, Jr., Wyncote, PA (US)

(73) Assignee: RPH Intellectual Holdings, LLC, San Antonio, TX (US)

( * ) Notice: Subject to any disclaimer, the term of this patent is extended or adjusted under 35 U.S.C. 154(b) by 0 days.

(21) Appl. No.: 15/802,206

(22) Filed: Nov. 2, 2017

(65) Prior Publication Data

US 2018/0123333 A1 May 3, 2018

Related U.S. Application Data

(60) Provisional application No. 62/416,511, filed on Nov. 2, 2016.

(51) Int. Cl.
*H02G 3/22* (2006.01)
*F16L 5/04* (2006.01)

(52) U.S. Cl.
CPC . *H02G 3/22* (2013.01); *F16L 5/04* (2013.01)

(58) Field of Classification Search
None
See application file for complete search history.

(56) References Cited

U.S. PATENT DOCUMENTS

| 3,654,382 | A | * | 4/1972 | Rubright | F16B 9/02 174/153 G |
| 4,262,166 | A | * | 4/1981 | Radzishevsky | H02G 3/22 174/151 |
| 4,272,643 | A | * | 6/1981 | Carroll | H02G 3/22 174/483 |
| 4,729,752 | A | * | 3/1988 | Dawson, Jr. | H01R 13/7195 333/185 |
| 4,764,422 | A | * | 8/1988 | Hill | H02G 3/22 428/309.9 |
| 4,794,207 | A | * | 12/1988 | Norberg | H02G 3/125 174/505 |

(Continued)

*Primary Examiner* — Kyle K. Walraed-Sullivan
(74) *Attorney, Agent, or Firm* — Gunn, Lee & Cave, PC

(57) ABSTRACT

A wall penetration panel with a cover plate made of a corrosion-resistant material and having a first side surface, a second side surface and an edge surface adjacent to the first side surface and the second side surface; a first gasket having a first side surface, a second side surface, and a second gasket opening between the first side surface and the second side surface, the first side surface adjacent to the second side surface of the cover plate; a frame made of a corrosion-resistant and having a first side surface, a second side surface, and a frame opening between the first side surface and the second side surface, the first side surface being adjacent to and in contact with the second side surface of the first gasket, the frame have an depth and a thickness, and a rolled end having a partially cylindrical surface defining a partially cylindrical volume intersecting the edge surface of the cover plate; and a second gasket having a first side surface, a second side surface, and a first gasket opening between the first side surface and the second side surface.

14 Claims, 3 Drawing Sheets

(56) References Cited

U.S. PATENT DOCUMENTS

| | | | | |
|---|---|---|---|---|
| 4,889,298 A * | 12/1989 | Hauff | F16L 5/08 | 248/56 |
| 4,950,185 A * | 8/1990 | Boutros | H01R 13/7195 | 333/183 |
| 5,146,720 A * | 9/1992 | Turner | H02G 3/22 | 249/214 |
| 5,170,017 A * | 12/1992 | Stanevich | H02G 15/013 | 174/151 |
| 5,326,060 A * | 7/1994 | Chubb | F21V 21/02 | 174/503 |
| 5,326,931 A * | 7/1994 | Cain | H02G 3/123 | 174/503 |
| 5,340,334 A * | 8/1994 | Nguyen | H01R 13/7195 | 439/620.12 |
| 5,344,106 A * | 9/1994 | Beele | A62C 2/06 | 248/56 |
| 5,442,140 A * | 8/1995 | Mc Grane | F16L 5/10 | 174/151 |
| 5,538,035 A * | 7/1996 | Gavin | E03F 3/04 | 137/363 |
| 5,598,670 A * | 2/1997 | Humphrey | F21S 8/033 | 174/502 |
| 5,610,368 A * | 3/1997 | Smith | G06F 1/182 | 174/355 |
| 5,806,139 A * | 9/1998 | Anderson | B60R 16/0222 | 16/2.1 |
| 5,831,217 A * | 11/1998 | Jarvis | H02G 3/22 | 174/153 R |
| 5,887,396 A * | 3/1999 | Thoreson | A62C 2/065 | 52/1 |
| 6,240,903 B1 * | 6/2001 | Kurozumi | F02F 7/006 | 123/195 C |
| 6,450,505 B1 * | 9/2002 | Gavin | E03F 5/021 | 249/39 |
| 6,609,718 B1 * | 8/2003 | Gavin | E03F 5/021 | 249/39 |
| 6,723,921 B2 * | 4/2004 | Vagedes | H02G 3/123 | 174/54 |
| 7,534,965 B1 * | 5/2009 | Thompson | H02G 3/22 | 16/2.1 |
| 7,946,545 B2 * | 5/2011 | Nurenberg | F24F 13/078 | 248/222.41 |
| 8,898,974 B1 * | 12/2014 | Gardner | H02G 3/22 | 52/220.8 |
| 9,151,042 B2 * | 10/2015 | Simon | E04B 1/944 | |
| 9,523,200 B2 * | 12/2016 | Lechuga | F24F 13/0254 | |
| 9,692,193 B1 * | 6/2017 | Schnorr | H02G 3/22 | |
| 9,935,444 B1 * | 4/2018 | Gardner | H02G 3/22 | |
| 2002/0027325 A1 * | 3/2002 | Kogler | F16L 5/10 | 277/315 |
| 2004/0016190 A1 * | 1/2004 | Radke | E04G 15/061 | 52/232 |
| 2004/0016191 A1 * | 1/2004 | Whitty | F16L 5/04 | 52/232 |
| 2004/0029443 A1 * | 2/2004 | Quadir | H01B 17/306 | 439/587 |
| 2004/0231880 A1 * | 11/2004 | Beele | A62C 3/16 | 174/668 |
| 2005/0179214 A1 * | 8/2005 | Beele | F16L 5/04 | 277/628 |
| 2006/0027388 A1 * | 2/2006 | Collins | H02G 3/22 | 174/663 |
| 2006/0060369 A1 * | 3/2006 | Hemingway | A62C 3/16 | 174/58 |
| 2006/0082137 A1 * | 4/2006 | Muenzenberger | F16L 5/04 | 285/124.5 |
| 2007/0169963 A1 * | 7/2007 | Beele | F16L 5/04 | 174/650 |
| 2007/0199728 A1 * | 8/2007 | Hedstrom | F16L 5/08 | 174/50.5 |
| 2008/0084032 A1 * | 4/2008 | Cravens | B60R 13/06 | 277/609 |
| 2009/0242230 A1 * | 10/2009 | Hebert | H02G 3/14 | 174/67 |
| 2010/0059941 A1 * | 3/2010 | Beele | F16L 5/10 | 277/606 |
| 2010/0192490 A1 * | 8/2010 | Chang | F16L 5/14 | 52/220.1 |
| 2011/0041432 A1 * | 2/2011 | Colwell | H02G 3/22 | 52/220.8 |
| 2011/0088917 A1 * | 4/2011 | Lee | A62C 2/06 | 169/45 |
| 2011/0203201 A1 * | 8/2011 | Lechuga | F16L 59/18 | 52/220.1 |
| 2011/0290520 A1 * | 12/2011 | Nishimura | H01R 13/5208 | 174/50.5 |
| 2011/0319269 A1 * | 12/2011 | Oyama | H01R 4/68 | 505/150 |
| 2012/0080856 A1 * | 4/2012 | Smith | F16B 43/001 | 277/624 |
| 2012/0224933 A1 * | 9/2012 | Anderson | F16L 5/06 | 411/313 |
| 2012/0273064 A1 * | 11/2012 | Ismert | F16L 5/10 | 137/360 |
| 2013/0091789 A1 * | 4/2013 | Simon | E04B 1/944 | 52/220.8 |
| 2013/0106060 A1 * | 5/2013 | Beele | F16L 5/10 | 277/314 |
| 2014/0097577 A1 * | 4/2014 | Martensson | F16L 5/10 | 277/606 |
| 2014/0138920 A1 * | 5/2014 | Munroe | F16L 39/02 | 277/606 |
| 2015/0054229 A1 * | 2/2015 | Haynes | F16L 5/10 | 277/606 |
| 2016/0108611 A1 * | 4/2016 | Gilleran | F16L 5/10 | 52/58 |
| 2018/0058682 A1 * | 3/2018 | Treloar | F16L 5/02 | |

* cited by examiner

WALL PENETRATION PANEL

CROSS REFERENCES TO RELATED APPLICATIONS

This application claims the benefit of U.S. provisional application Ser. No. 62/416,511 filed Nov. 2, 2016 entitled Wall Penetration Shroud which is incorporated by reference herein.

FEDERALLY SPONSORED RESEARCH

Not applicable.

BACKGROUND OF THE INVENTION

1. Field of the Invention

This invention relates generally to construction. More specifically, the invention relates to a panel for use with conduit, piping, cable and the like extending through a vertical wall of a building.

2. Description of the Related Art

During building construction, or during the process of installing equipment in an already finished building, it is often necessary to penetrate through a vertical wall for running conduit or pipe between locations. For example, it is common to run refrigerant piping directly through the wall of a mechanical room to an adjacent and outside HVAC pad. This, however, exposes the opening in the wall to elements.

There are a number of existing solutions to this problem, with the most common being a wall shroud mounted to the vertical wall and surrounding the wall penetrations and piping. Typically, these shrouds are generic, off-the-shelf shrouds not designed for a specific installation. As a result, such generic solutions can be ill suited because of their need to be able to address a variety of conditions. This, in turn, may cause issues with proper fitting and reliability. The seal around the flange may also degrade over time and, if not properly maintained, be susceptible to leaking. Such leaking may lead to water contacting the cable or electrical wire and causing rust or other degrading affects, as well as water entering into the wall penetration and resulting in mold.

Another solution if a PVC sleeve positioned through the penetration. Such sleeves are undesirable because there is no UV protection for the sleeve itself and there is not an insurable method by contractor completion of the seal around the annular space to warrant leak prevention/resistance between the outer diameter of the PVC sleeve and the outer wall.

Furthermore, there is a need to satisfy ICC building codes (specifically ICC 2014-500) related to the construction of storm shelters for tornado and hurricane construction. Tornados and hurricanes generate substantial winds that create hazardous debris. Inadequate designed wall penetration shrouds may fail to meet the wind loads and debris loads required for tornado and hurricane areas.

In light of the foregoing, there is a need for an off-the-shelf shroud/panel for vertical or near vertical walls to meet building codes for tornado and hurricane winds and related debris with an improved ability to inhibit leaking to the pipes, conduit, etc. and into and/or through the wall penetrations.

BRIEF SUMMARY

The present invention is a wall penetration shroud with a cover plate made of a corrosion-resistant material and having a first side surface, a second side surface and an edge surface adjacent to the first side surface and the second side surface; a first gasket having a first side surface, a second side surface, and a second gasket opening between the first side surface and the second side surface, the first side surface adjacent to the second side surface of the cover plate; a frame made of a corrosion-resistant and having a first side surface, a second side surface, and a frame opening between the first side surface and the second side surface, the first side surface being adjacent to and in contact with the second side surface of the first gasket, the frame have an depth and a thickness, and a rolled end having a partially cylindrical surface defining a partially cylindrical volume intersecting the edge surface of the cover plate; and a second gasket having a first side surface, a second side surface, and a first gasket opening between the first side surface and the second side surface.

DETAILED DESCRIPTION OF CERTAIN EMBODIMENTS

Figure 1:
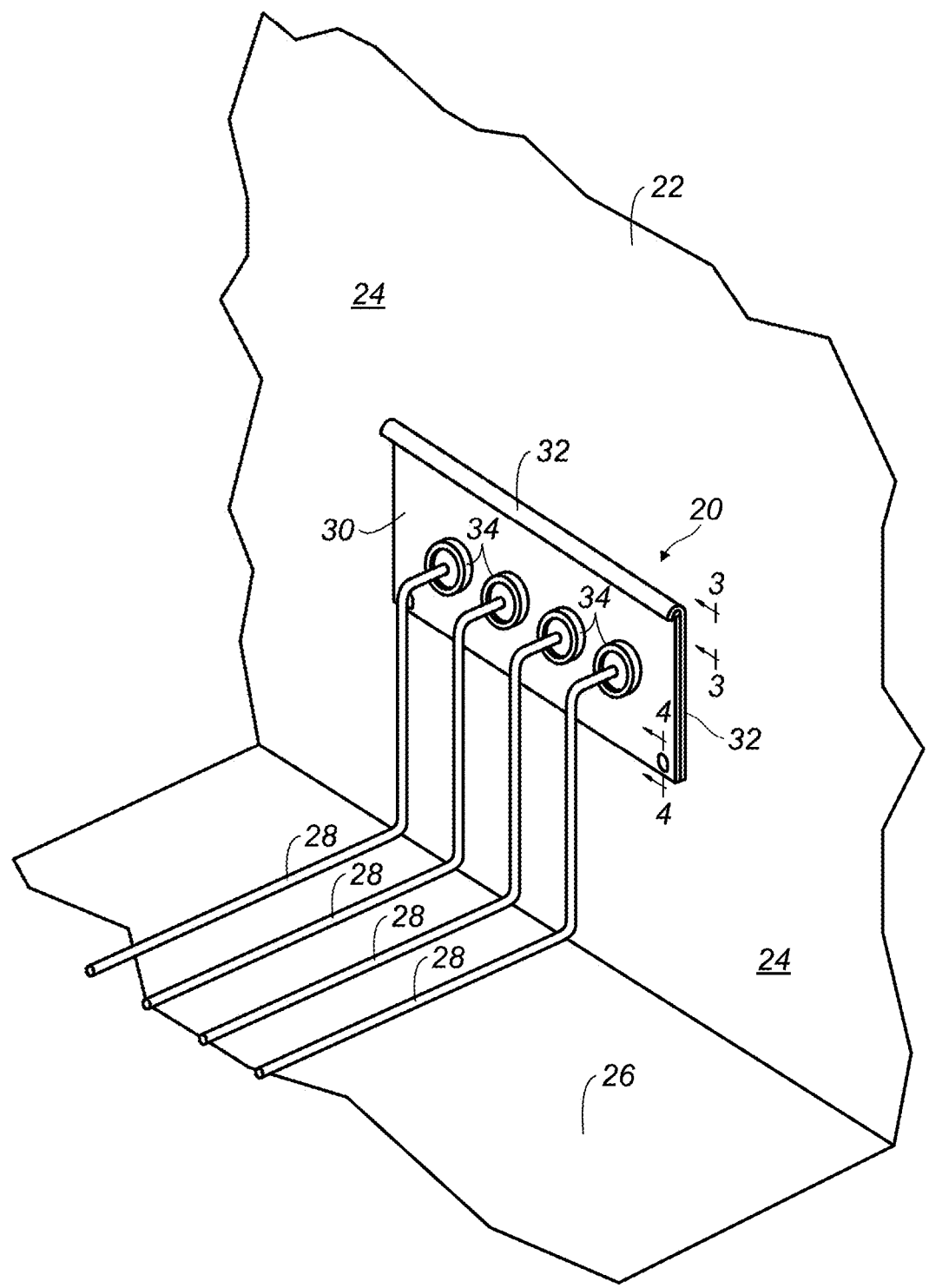
FIG. 1 shows an embodiment of the invention mounted to a wall.

FIG. 1 shows an embodiment 20 of the invention mounted to a vertical wall 22 having a wall surface 24. The wall 22 is a parapet or utility service wall on a roof 26, which supports, for example, an HVAC condensing unit (not shown). Refrigerant lines 28 pass through the wall 22 and the embodiment 20 to provide a fluid communication path to the condensing unit from, for example a nearby mechanical room.

The embodiment 20 includes a rectangular cover plate 30 mounted to a rectangular frame 32. The frame 32 is mounted to the wall 22. The embodiment 20 includes cylindrical penetration seals 34 encircling the refrigerant lines 28.

Figure 2:
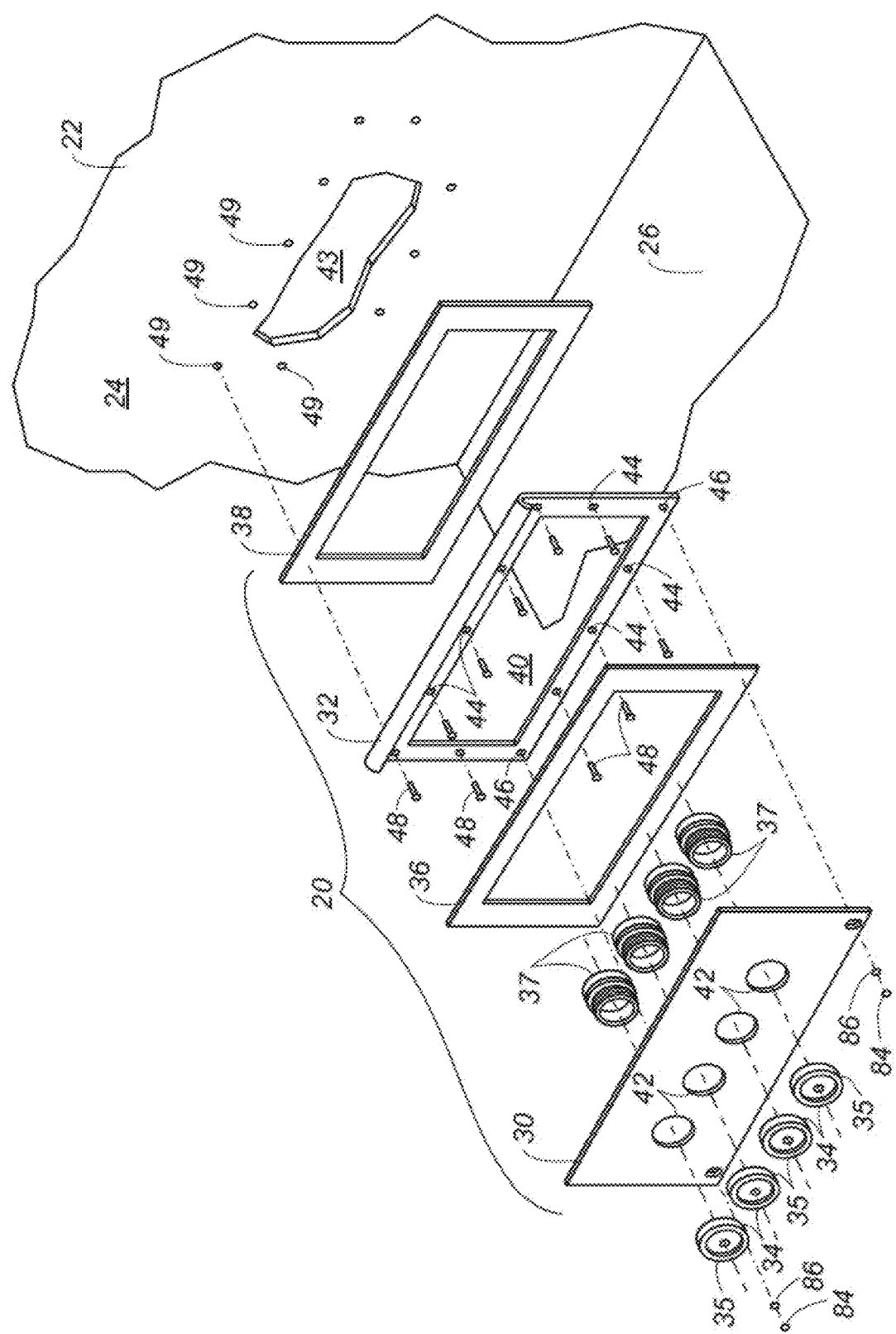
FIG. 2 is an assembly view of the embodiment shown in FIG. 1.

Referring to FIG. 2, in addition the cover plate 30 and frame 32, the embodiment 20 includes a first gasket 36 and a second gasket 38. The first gasket 36 and second gasket 38 are each preferably silicone. The first gasket 36 is between the cover plate 30 and the frame 32. The second gasket 38 is between the frame 32 and the wall 22. The frame 32 defines a rectangular opening 40. Each of the first gasket 36 and second gasket 38 are generally rectangular shaped and sized to correspond to the frame 32.

The cover plate 30 is a panel having roughly the same dimensions as the frame 32. The cover plate 30 includes at least one generally cylindrical seal opening 42 aligned with the frame opening 40. The seals 34, which may be VAULT® 5000, 6000, or 7000 series seals manufactured by Roof Penetration Housings, LLC of San Antonio, Tex., are installed in the generally cylindrical opening 42. The disclosed embodiment shows the VAULT® 5000 seal comprised of a first portion 35 and a second portion 37. The second portion 36 is positioned within the cylindrical opening 42 and screws into the first portion 35. The cover plate 30 is positioned between the first portion 35 and the second portion 37 creating a seal around the cylindrical opening 42. The frame opening 40 and seal openings 42 are aligned with a penetration 43 through the wall 22 from which lines or piping extend.

The frame 32 has cylindrical surfaces defining bolt openings 44, 46 there through. The frame 32 is mounted to the wall 22 using wall anchors 48 extending through cylindrical openings 44 the anchors are engaged with holes 49 in the wall 22.

Figure 3:
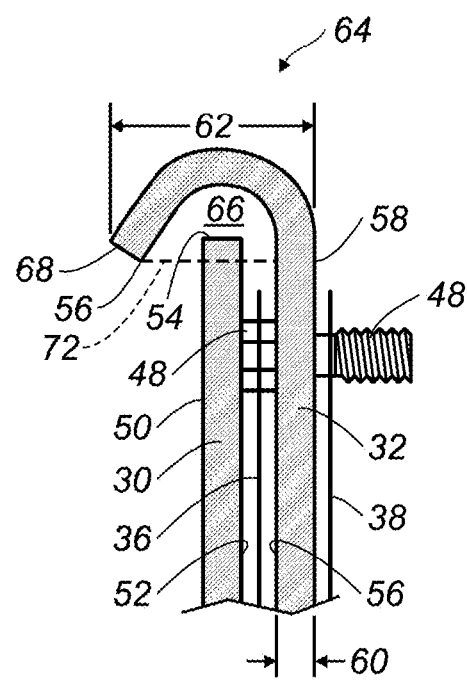
FIG. 3 is a side sectional view through line 3-3 of FIG. 1.

Referring to FIG. 3, the cover plate 30 has a first side surface 50, a second side surface 52. A perimeter surface 54 is adjacent to the first side surface 50 and the second side surface 52.

The frame 32 has a first side surface 56, a second side surface 58, a panel thickness 60, and a frame depth 62. A rolled end 64 of the frame 32 is curved away from the second side surface 58 to define a partially cylindrical volume 66. The rolled end 64 terminates with an elongate planar surface 68 that is adjacent to the first side surface 56 at a linear junction 70. A reference plane 72 perpendicular to the first side surface 50 of the cover plate 30 defines a boundary of the partially cylindrical volume 66. The surface 54 of the cover plate 30 is within the partially cylindrical volume 66, which inhibits precipitation and other elements from entering the space between the cover plate 30 and frame 32.

Figure 4:
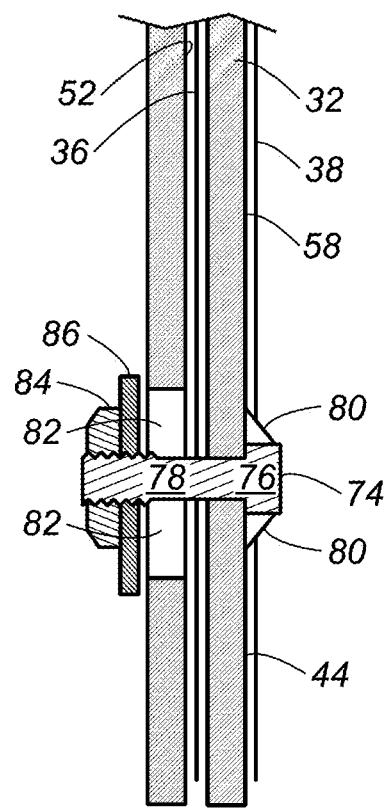
FIG. 4 is a side view from line 4-4 of FIG. 1.

Referring to FIG. 4, two theft resistant bolts 74 are attached to the second side surface 58 of the frame 34. Each bolt 74 has a head 76 and a threaded shank 78. The bolt head 76 is attached to the second side surface 58 with welds 80. The shank 78 of each bolt 74 extends through corner openings 46.

The cover plate 30 has surfaces 82 defining oblong openings between the first side surface 50 and the second side surface 52. The oblong openings are aligned with and circumscribe the bolt shanks 78. Two nuts 84 are threadedly engaged with the bolts shanks 78. Washers 86 are between the nuts 80 and the first side surface 50 of the cover plate 30. The bolts 74 extend through the first gasket 36 and second gasket 38.

Referring jointly to FIG. 3-4, to install the cover plate 30, the oblong openings defined by surfaces 82 are first aligned with the bolt shanks 78 and the cover plate 30 allowed to rest on the shanks 78 under force of gravity. In this position, the surface 54 (FIG. 3) is not within, or alternatively only slightly within, the partially cylindrical volume 66. Thereafter, the cover plate 30 may be moved toward the volume 66 until restricted from further upward movement by contact of the bolt shanks 78 with the other end of the oblong openings, after which washers 84 and nuts 86 may be installed and tightened. In this position, the rolled end 64 inhibits precipitation and other elements from entering the space between the cover plate 30 and frame 32.

The cover plate 30 and frame 32 may be constructed of aluminum. To satisfy current building codes for storm shelters in tornado and hurricane risk areas the cover plate 30 and frame 32 may be constructed out of high modular polypropylene plastic (HMPP). HMPP may satisfy high impact resistance requirements for certain building codes in tornado prone areas. In a preferred embodiment, the HMPP may be ⅜" thick. To obtain the same levels of wind and debris resistance aluminum may be over 2" thick which is impractical based on cost, performance and design.

The present invention is described in terms of specifically-described embodiments. Those skilled in the art will recognize that other embodiments of such device can be used in carrying out the present invention. Other aspects and advantages of the present invention may be obtained from a study of this disclosure and the drawings, along with the appended claims.

We claim:

1. A wall penetration panel comprising:
a cover made of a corrosion-resistant material and having a first side surface, a second side surface, a cover opening extending through the first side surface of the cover and the second side surface of the cover, and an edge surface adjacent to the first side surface of the cover and the second side surface of the cover;
a first gasket having a first side surface, a second side surface, and a first gasket opening extending through the first side surface of the first gasket and the second side surface of the first gasket, the first side surface of the first gasket is adjacent to the second side surface of the cover;
a frame made of a corrosion-resistant material and having a first side surface, a second side surface, a frame opening extending through the first side surface of the frame and the second side surface of the frame, and a rolled end having a partially cylindrical surface defining a partially cylindrical volume intersecting the edge surface of the cover, the first side surface of the frame is adjacent to the second side surface of the first gasket;
a second gasket having a first side surface, a second side surface, and a second gasket opening extending through the first side surface of the second gasket and the second side surface of the second gasket, the first side surface of the second gasket is adjacent to the second side surface of the frame; and
at least one wall penetration panel opening extending through the cover, the first gasket, frame and second gasket wherein the at least one wall penetration panel opening comprises at least a portion of the cover opening, at least a portion of the first gasket opening, at least a portion of the frame opening, and at least a portion of the second gasket opening.

2. The wall penetration panel of claim 1 wherein the cover, first gasket, frame, and second gasket are secured together.

3. The wall penetration panel of claim 1 wherein the first gasket opening, frame opening, and second gasket opening generally correspond in size and shape.

4. The wall penetration panel of claim 1 further comprising a seal positioned within the cover opening.

5. A wall penetration panel comprising:
a cover having a first side surface, a second side surface, a top edge surface, and a cover opening extending through the first side surface of the cover and the second side surface of the cover;
a first gasket having a first side surface, a second side surface, and a first gasket opening extending through the first side surface of the first gasket and the second side surface of the first gasket wherein the first side surface of the first gasket is adjacent to the second side surface of the cover;
a frame having a first side surface, a second side surface, a rolled end, and a frame opening extending through the first side surface of the frame and the second side surface of the frame wherein the first side surface of the frame is adjacent to the second side surface of the first gasket;
a second gasket having a first side surface, a second side surface, and a second gasket opening extending through the first side surface of the second gasket and the second side surface of the second gasket wherein the first side surface of the second gasket is adjacent to the second side surface of the frame;

wherein at least a portion of the cover plate opening, at least a portion of the first gasket opening, at least a portion of the frame opening, and at least a portion of the second gasket opening are aligned.

6. The wall penetration panel of claim 5 wherein a rolled end extends over the top edge surface of the cover.

7. The wall penetration panel of claim 5 wherein the cover and frame are made of a corrosion-resistant material.

8. The wall penetration panel of claim 5 wherein the cover, first gasket, frame, and second gasket are secured together.

9. The wall penetration panel of claim 5 wherein the first gasket opening, frame opening, and second gasket opening generally correspond in size and shape.

10. The wall penetration panel of claim 9 further comprising a seal positioned within the cover opening.

11. The wall penetration panel of claim 3 wherein the cover opening is smaller than the first gasket opening, frame opening, and second gasket opening.

12. The wall penetration panel of claim 11 further comprising a plurality of cover openings within the cover.

13. The wall penetration panel of claim 9 wherein the cover opening is smaller than the first gasket opening, frame opening, and second gasket opening.

14. The wall penetration panel of claim 13 further comprising a plurality of cover openings within the cover.

\* \* \* \* \*